United States Patent Office 2,846,246
Patented Aug. 5, 1958

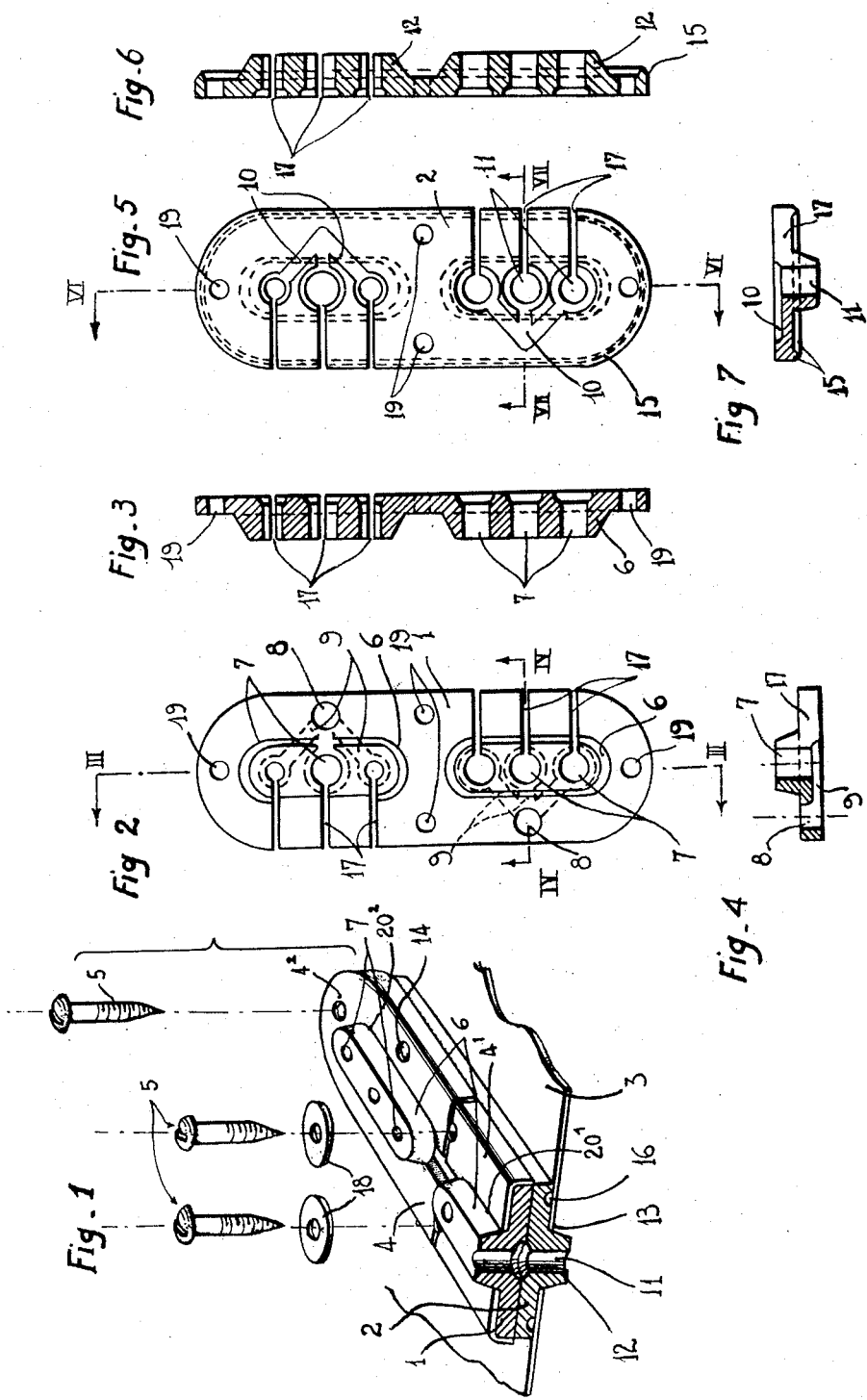

2,846,246

SEALING DEVICE FOR CABLES OR PIPES PASSING THROUGH A WALL OR PARTITION

Lucien Péras, Billancourt, France, assignor to Regie Nationale des Usines Renault, Billancourt, France, French works under the control and the authority of the French Government Application March 22, 1957, Serial No. 647,894

Claims priority, application France April 12, 1956

5 Claims. (Cl. 286—16)

This invention relates to a sealing device ensuring the fluid-tight passage of cables, wires or pipe lines through a wall or partition subjected on its two sides to different atmospheres or media, this sealing device consisting of rubber plates formed with holes having substantially the diameter of the cables, wires or pipe lines, and being adapted to be clamped against the wall or partition by a kind of cover secured thereon in any suitable manner, the clamping action being sufficient to produce a deformation of the rubber and form sealing lips around the cables, wires or pipe lines.

Now it is the essential object of this invention to provide an improved sealing device of this character wherein the sealing member proper consists of a pair of rubber plates each provided on its outer face with one or more perforated bosses through which the cables, pipes or like connections may be passed and guided, these passages being sealed by injecting a suitable cement in channels formed half in the material of one plate and half in the material of the other plate, on the joint-forming faces of said plates, these plates being secured in a fluid-tight manner on the partition or wall by the clamping action of a cover member, the boss or bosses of the lower plate engaging one or more slots or like elongated holes formed in the partition or wall where it is desired to obtain the fluid-tight passage of said cables, wires or pipe lines.

In order to afford a clearer understanding of this invention and of the manner in which the same may be carried out in the practice, reference will now be made to the attached drawing forming part of this specification and illustrating diagrammatically by way of example a typical embodiment of the invention.

In the drawing:

Figure 1 is a perspective, part-sectional view of the device mounted on a wall or partition;

Figure 2 is a plane view from beneath of the upper plate;

Figures 3 and 4 are sections taken upon the line III—III and IV—IV of Fig. 2, respectively;

Figure 5 is a plane view from above of the lower plate, and

Figures 6 and 7 are sections taken upon the lines VI—VI and VII—VII of Fig. 3.

Referring first to Fig. 1, the improved sealing device of this invention comprises essentially two plates 1, 2 of moulded rubber or elastic plastic material, which are superposed to each other and held in this position on the wall or partition 3 by means of a metal case or cover 4 secured on the wall or partition by means of screws 5.

The wall 3 may consist of relatively thin sheet metal, cardboard or plastic material, and if desired and according to local conditions the case or cover 4 may be secured through any other suitable means.

In the example illustrated by way of example, the device is designed for permitting the passage of six cables or pipe lines, the plates 1, 2 comprising each two perforated bosses for holding and guiding the cables or pipe lines while avoiding any undesired contact between these cables or pipe lines and the case; thus, in the case of insulated electric conductors, which is the principal application contemplated for this device, the insulating sheaths thereof will be protected against a possible deterioration.

As shown more in detail in Figs. 2 to 4 of the drawing, the upper plate 1 comprises two bosses 6, each formed with three orifices 7 having the diameter of the cables or pipe lines to be fitted therethrough (not shown).

To each boss 6 there corresponds an orifice 8 formed in the body of the plate and communicating with three channels 9 having a semi-circular cross-section open at the lower face of the plate and leading into the lower ends of the orifices 7 for the cables, pipe-lines or the like, these lower ends being widened as clearly shown in the sectional views of the drawing.

As shown in Figs. 5 to 7 of the drawing, the upper face of the lower plate 2 is also formed with three open channels 10 having a semi-circular cross-section. These channels lead into the upper portions of the orifices 11 for the cables, pipe-lines or the like, which are formed in the bosses 12 also moulded integrally with the plate but on the lower face thereof.

Thus, when the device is assembled as shown in perspective in Fig. 1, the two plates 1, 2 are superposed and their flat faces applied against each other, the bosses 12 of the lower plate engage the slots 13 of same dimensions which are formed in the wall 3, and the orifice 8 communicates with the channels 9, 10 which form together as many passages of circular cross-section.

A perfect sealing of the cables or pipe lines in their respective aligned orifices 7, 11 is then obtained by injecting cement or any other convenient material into the orifices 8 registering with the orifices 14 formed in the case 4.

The cement fed in the liquid state through the channels leading from the orifices 8 will thus surround the periphery of the cables or the like along the portions thereof which extend through the two assembled plates and when the cement sets this passage becomes completely fluid tight, even if the cable surface is uneven and the rubber does not accommodate exactly the shape thereof.

The assembly is fluid-tight relative to the wall 3 due to the crushing of the lower lips 15 formed along the outer periphery of the plate 2, as evidenced by Figs. 5 to 7. According to a modified embodiment illustrated in Fig. 1, the fluid tightness between the lower plate and the wall may be further improved by injecting cement into a channel 16 formed on the lower peripheral edge of said plate and communicating with the injection orifices 8.

In order to permit the fitting of the sealing device of this invention on cables or pipe lines already mounted and extending through a wall 3, each plate is formed with transverse slits 17 extending from the orifices 7 and 11, the latter being opposite to the injection channels 9 and 10 for obvious reasons, and tending to become constricted during the fixation step, due to the tapered shape of the plate bosses and to the action exerted by the slots $20^1$ and $20^2$ of the case or cover 4, which fit over said bosses.

For the same reasons, the fixation case 4 may be made of two halves $4^1$ and $4^2$ secured for example by means of four screws 5, the two central screws engaging both halves simultaneously through the medium of a washer 18, each plate comprising holes 19 for the passage of the fixation screws.

Of course, this embodiment is given by way of example only and should not be construed as limiting the purpose of the invention as many modifications may be brought thereto without departing from the spirit and scope of the invention as set forth in the appended claims.

What is claimed is:

1. A sealing device for permitting the fluid-tight passage of cables and the like through a wall having its faces subjected to different media, which comprises two superposed plates of elastic material and a cover member which are formed with holes, positioned preferably along the longitudinal center line of said plates of the passage of said cables, the inner plate opposite to said cover member being adapted to engage said wall, said inner plate having its inner face formed with one or more bosses projecting therefrom and surrounding said passage holes, holes in said wall which correspond in shape and dimensions to, and are adapted to receive, said bosses, all the passage holes of one boss being connected through semicircular sectioned branch channels opening in the outer face of said inner plate to a common point, said outer plate having an inner face adapted to fit on the outer face of said inner plate and formed with branched channels also of semi-circular cross-section which register with the channels of said inner plate and constitute therewith substantially circular-sectioned channels, the outer face of said outer plate being formed with bosses projecting therefrom and surrounding said passage holes, filler holes extending through said outer plate and cover member at a point registering with said common point of said inner plate, registering fixation holes formed through said inner and outer plates, and also through said cover member and said wall and fastening members adapted to be inserted through the aligned fixation holes of said plates, cover member and wall, whereby when said device is assembled and mounted a suitable cement may be injected through said cover member into said filler holes and channels to seal the cables and like elements in said passage holes.

2. A sealing device as set forth in claim 1, wherein said wall-engaging inner face of said inner plate is formed with an outer peripheral lip projecting from said face and constituting an additional sealing means adapted to bear against the wall surface when the device is fixed thereon.

3. A sealing device for permitting the fluid-tight passage of cables and the like through a wall having its faces subjected to different media, which comprises two superposed plates of elastic material and a cover member of relatively rigid material which are all formed with holes positioned preferably along the longitudinal centre line of said plates for the passage of said cables and the like, the inner plate opposite to said cover member being adapted to engage said wall, said inner plate having its inner face formed on the one hand with one or more bosses projecting therefrom and surrounding said passage holes and on the other hand with an outer peripheral lip projecting slightly from said face and constituting an additional sealing means adapted to bear against the wall surface when the device is fixed thereon, holes in said wall which correspond in shape and dimensions to, and are adapted to receive, said bosses, all the passage holes of one boss being connected through semi-circular sectioned branch channels opening in the outer face of said inner plate to a common point, said outer plate having an outer face adapted to fit on the outer face of said inner plate and formed with branched channels also of semi-circular cross-section which register with the channels of said inner plate and constitute therewith substantially circular-sectioned channels, the outer face of said outer plate being formed with bosses projecting therefrom and surrounding said passage holes, filler holes extending through said outer plate and cover member at a point registering with said common point of said inner plate, each plate being formed with transverse registering slits formed through the plate material and connecting each passage hole to an adjacent edge of the plate to permit the mounting of the sealing device on existing cables and the like passing through a wall, registering fixation holes formed through said inner and outer plates and also through said cover member and said wall, and fastening members adapted to be inserted through the aligned fixation holes of said plates, cover member and wall, whereby when said device is assembled and mounted, a suitable cement may be injected through said cover member into said filler holes and channels to seal the cables and like elements in said passage hole.

4. A sealing device as set forth in claim 3, wherein said cover member consists of two halves separated by a central, transverse joint line on which two fixation holes are positioned, the corresponding fastening members such as screws which pass through said two fixation holes being provided with relatively large washers to assist in maintaining said cover member halves in position, the other fixation holes being positioned preferably at either end of the device.

5. A sealing device as set forth in claim 3, wherein said outer peripheral lip formed on the inner face of said inner plate provides an inner space communicating with said channels, whereby said cement may also fill this space to improve the sealed property of the device.

References Cited in the file of this patent

UNITED STATES PATENTS

| 1,287,285 | Gammeter | Dec. 10, 1918 |
| 2,410,999 | Reisner | Nov. 12, 1946 |
| 2,517,717 | Rose | Aug. 8, 1950 |
| 2,522,329 | Wolff | Sept. 12, 1950 |

FOREIGN PATENTS

| 262,532 | Great Britain | Dec. 17, 1926 |